United States Patent Office 3,658,716
Patented Apr. 25, 1972

3,658,716
METHOD OF GELLING AN ORGANIC LIQUID WITH TERPOLYMER AND GELLED COMPOSITION
Henry L. Hsieh, Bartlesville, Okla., assignor to Phillips Petroleum Company
No Drawing. Filed May 1, 1969, Ser. No. 821,070
Int. Cl. B01j *13/00;* C10l *7/02*
U.S. Cl. 252—316
13 Claims

ABSTRACT OF THE DISCLOSURE

An organometallic compound and a terpolymer of an alkene oxide, a cyclic acid anhydride and a cyclic ether are used to gel an organic liquid. The formed gel is stable in air, but reverts to a fluid upon the addition of an acid.

---

This invention relates to gels. In another aspect, this invention relates to a method of preparing gels. In still another aspect, this invention relates to a method of fluidizing the formed gels.

Gelled liquids, particularly gelled hydrocarbons, are well known in the art. In many instances, gels are difficult to formulate at ambient temperatures, particularly where it is desirable to gel relatively low-boiling liquids.

I have now discovered that gels can be prepared by the addition of an organometallic compound to a solution of a terpolymer of an alkene oxide, a cyclic acid anhydride and a cyclic ether, in an organic liquid such as a hydrocarbon, an acyclic or cyclic ether, a ketone, or a hydrogen-substituted hydrocarbon. The gels prepared in this manner can be converted to a liquid state by the addition of an acid.

It is an object of my invention to provide a gel. It is another object of my invention to provide a method for making a gel and a still further object to provide a method of fluidizing the formed gel.

Other objects, advantages and features of my invention will be obvious to one skilled in the art from the following disclosure and claims.

The term "terpolymers" as used herein designates a polymeric product in which three different types of monomers are present in the terpolymer. The terpolymer used in the process of my invention is a polymer formed by copolymerizing an alkene oxide, a cyclic acid anhydride and a cyclic ether. One such terpolymer comprises the polymer formed by copolymerizing epichlorohydrin, phthalic anhydride, tetrahydrofuran in the presence of triisobutylaluminum and zinc acetylacetonate. This terpolymer and the method for preparing it are disclosed in my copending application, Ser. No. 821,069, filed May 1, 1969, as are other methods of preparing such a terpolymer. One method of producing such a terpolymer comprises charging a reactor first with anhydride, then the cyclic ether, then the alkene oxide; adding polymerization catalyst which is an organo-metallic compound; terminating the polymerization after a desired length of time by the addition of a catalyst inactivating agent, such as isopropyl alcohol; and separating and drying the resulting product by conventional means. The composition ranges of the monomers in the terpolymer can be conveniently expressed in terms of the molar ratio of two of the monomers to the third monomer. The mole ratio of the alkene oxide to the cyclic acid anhydride ranges from 0.6/1 to 1.4/1, preferably from 0.8/1 to 1.2/1. The mole ratio of the cyclic ether to cyclic acid anhydride ranges from 0.1/1 to 1/1, preferably from 0.5/1 to 1/1. The monomers of each type can also combine in essentially equimolar ratios in recurring sequence; i.e. 1/1/1.

Although the monomers can be present in the ABC terpolymer in essentially equimolar proportions, the mole ratio of the monomers can be varied and the amount of ABC terpolymer thus obtained is determined in some instances by the monomer present in the least amount. In the preferred method of preparing these ABC terpolymers, an excess amount of cyclic ether monomer is used in the reaction mixture, as the cyclic ether can also serve as a diluent for the reaction mixture.

All of the cyclic ether that is polymerized reacts in such a manner that it forms a terpolymer unit with ABC structure with the alkene oxide and the cyclic acid anhydride. Excess amounts of alkene oxide and cyclic acid anhydride appear in random fashion throughout the terpolymer or, if little or no cyclic ether is present, copolymerize with each until one of these two monomers is exhausted.

In this ABC terpolymer, at least 10 weight percent of the polymer has this ABC structure, preferably at least 50 weight percent, in order to obtain the advantages of the ABC structure.

Alkene oxides employed in the making of this ABC terpolymer can be saturated, unsaturated, or a mixture thereof. Alkene oxides containing up to and including 20 carbon atoms per molecule can be used in the formation of the terpolymer. Alkene oxides which can be polymerized in accordance with this invention can be represented by the following formula:

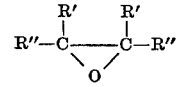

wherein each R'' and R' is selected from the group consisting of hydrogen, saturated aliphatic, saturated cycloaliphatic, monoolefinic aliphatic, diolefinic aliphatic, monoolefinic cycloaliphatic, diolefinic cycloaliphatic and aromatic radicals, and combinations of these such as aralkyl, alkaryl, and the like. Some or all of the R'' and R' radicals can also be halogensubstituted, and can contain oxygen in the form of an acyclic ether linkage (—O—) or an oxirane group

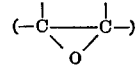

Further, the alkene oxide represented by the above formula can contain one or two olefinic linkages, one or two oxirane groups and up to one acyclic ether linkage. In addition, both R' radicals can represent a divalent aliphatic hydrocarbon radical which, together with the carbon atoms of the oxirane group, can form a cycloaliphatic hydrocarbon nucleus containing from about 4 to about 10 carbon atoms, preferably from about 4 to about 8 carbon atoms.

Specific examples of some of the alkene oxides which are within the above structural formula and which can be homopolymerized or copolymerized in accordance with this invention are ethylene oxide (epoxy ethane);
1,2-epoxypropane (propylene oxide);
1,2-epoxybutane;
2,3-epoxybutane;
2,3-epoxypentane;
1,2-epoxyhexane;
3,4-epoxyhexane;
1,2-epoxyheptane;
2,3-epoxyoctane;
2,3-dimethyl-2,3-epoxypentane;

1,2-epoxy-4-methylpentane;
2,3-epoxy-5-methylhexane;
1,2-epoxy-4,4-dimethylpentane;
4,5-epoxyeicosane;
1-chloro-2,3-epoxypropane (epichlorohydrin);
1-bromo-2,3-epoxypropane;
1,5-dichloro-2,3-epoxypentane;
2-iodo-3,4-epoxybutane;
styrene oxide;
6-oxybicyclo[3.1.0]hexane;
7-oxybicyclo[4.1.0]heptane;
3-propyl-7-oxabicyclo[4.1.0]heptane;
bis(2,3-epoxybutyl)ether;
tert-butyl 4,5-epoxyhexyl ether;
2-phenylethyl 3,4-epoxybutyl ether and the like.

Unsaturated alkene oxides within the above structural formula, including ethers, which can be homopolymerized or copolymerized in accordance with this invention include allyl 2,3-epoxypropyl ether (allyl glycidyl ether);
allyl 3,4-epoxybutyl ether;
1-methallyl 3,4-epoxyhexyl ether;
3-hexenyl 5,6-epoxyhexyl ether;
2,6-octadienyl 2,3,7,8-diepoxyoctyl ether;
6-phenyl-3-hexenyl 3-ethyl-5,6-epoxyhexyl ether;
3,4-epoxy-1-butene (butadiene monoxide);
3,4-epoxy-1-pentene;
5-phenyl-3,4-epoxy-1-pentene;
1,2,9,10-diepoxy-5-decene;
6,7-di-n-butyl-3,4,9,10-diepoxy-1,11-dodecadiene;
epoxy vinyl ether;
allyl 2-methyl-2,3-epoxypropyl ether;
3-cyclohexyl-2-propenyl 4-cyclohexyl-3,4-epoxybutyl ether;
2,4-pentadienyl 2,3-diethyl-3,4-epoxybutyl ether;
1-methallyl 6-phenyl-3,4-epoxyhexyl ether;
5-(4-tolyl)2,3-epoxypentyl vinyl ether;
bis[4-(3-cyclopentenyl)2,3-epoxybutyl] ether;
2-(2,4-cyclohexadienyl)ethyl 2,3-epoxybutyl ether;
2-(2,5-cyclohexadienyl)ethyl 2-benzyl-4,5-epoxypentyl ether;
3,4-epoxy-1,5-hexadienyl isopropyl ether;
allyl 3,4-dimethyl-3,4-epoxyhexyl ether;
3,4-epoxy-4-(2,3-dimethylphenyl)1-butene;
3,4-dimethyl-3,4-epoxy-1-pentene;
5-(4-methylcyclohexyl)3,4-epoxy-1-pentene;
4,5-diethyl-4,5-epoxy-2,6-octadiene;
4-(2,4-cyclopentadienyl)1,2,6,7-diepoxyheptane; and
1-phenyl-1,2-epoxy-5,7-octadiene, and the like.

The second type of monomer contained in the ABC terpolymer is a cyclic acid anhydride (cyclic carboxylic acid anhydride). This monomer can be saturated or unsaturated and can contain substituents such as alkyl, alkenyl, alkoxy, nitro, halo, and the like. Examples of such anhydrides include malonic anhydride, succinic anhydride, glutaric anhydride, adipic anhydride, pimelic anhydride, glutaconic anhydride, maleic anhydride, phthalic anhydride, tetrachlorophthalic anhydride, 3-nitrophthalic anhydride, allylsuccinic anhydride, pyromellitic dianhydride, chloroendic anhydride, endic anhydride, and the like. Mixtures of these compounds, saturated, unsaturated or both, can be used.

If either the alkene oxide, the cyclic acid anhydride, or both monomers contains carbon-carbon double bonds, the resulting ABC terpolymer will als ocontain carbon-carbon double bonds.

The third type of monomer used in preparing the ABC terpolymer is a compound selected from the group comprising cyclic mono- and polyethers (1,3- or 1,4-epoxides). Examples of such ethers are trimethylene oxide (oxetane), bis(chloromethyl)oxetane, tetramethylene oxide (tetrahydrofuran), paraldehyde, and the like.

The organometallic compound used in preparing the ABC terpolymer can be represented by the formula $R'''_n MX_m$ wherein each $R'''$ is a saturated aliphatic, a saturated cycloaliphatic hydrocarbon radical, or a combination thereof containing from 1 to 20 carbon atoms; M is calcium, magnesium, zinc, cadmium, aluminum, gallium, indium, thallium, silicon, or tin; X is hydrogen, fluorine, chlorine, bromine, iodine or $OR'''$; $n$ is an integer from 1 to 4; $m$ is an integer from 0 to 4 when X is $OR'''$ and from 0 to 3 when X is hydrogen or a halogen; and $n$ and $m$ equal the valence of the metal M. On optional cocatalyst can be used with the organometallic compound in preparing the ABC terpolymer. The mole ratio of optional cocatalyst to organometallic compound is in the range of 0.001:1 to 1:1, preferably 0.2:1 to 0.5:1. Specific examples of the optional cocatalysts are water, alcohols, or a complexing agent such as a beta-diketone or a metal salt thereof, such as zinc acetylacetonate.

In the preparation of the ABC terpolymer, there can be numerous variations in the charging procedure. Usually the cyclic acid anhydride is charged first. Then the diluent can be added followed by the remaining monomers, i.e., the cyclic ether and alkene oxide. Finally, the catalyst is added with the organometallic compound generally added before the cocatalyst. The polymerization is conducted in an inert atmosphere such as nitrogen. The diluent employed as a reaction media can be hydrocarbons such as aliphatic, cycloaliphatic, aromatic compounds and mixtures thereof. A liquid monomer or a mixture of liquid monomers, can be used instead of or in admixture with one or more hydrocarbon diluents.

The polymerization is conducted at temperatures ranging from $-100°$ F. to $300°$ F., preferably from $30°$ F. to $200°$ F. The time for polymerization depends upon the temperature and ranges from less than 1 minute to more than 10 days, preferably from 10 minutes to 50 hours. The polymerization reaction can be terminated by any suitable method conventionally used to inactivate organometallic catalyst such as by the addition of an alcohol such as isopropyl alcohol and the terpolymer can be then separated and dried.

The reaction mixture should be maintained substantially completely in the liquid phase and the pressure should be sufficiently high to achieve this result.

The organometallic compound used in preparing the gels can be represented by the formula $R_n MY_m$ wherein R is an aliphatic, cycloaliphatic or aromatic hydrocarbon radical containing from 1 to 20 carbon atoms; M is magnesium, cadmium, zinc or aluminum; Y is hydrogen or a halogen; $n$ is an integer 1, 2 or 3, $m$ is 0 or an integer 1 or 2; and $n+m$ equals valence of metal M. Examples of the organometallic compounds include dimethylmagnesium, di-n-butylmagnesium, diisopropylmagnesium, diisopropylcadmium, diphenylcadmium, dicyclohexylcadmium, diethylzinc, di-n-octylzinc, dicyclopentylzinc, triisobutylaluminum, triphenylaluminum, tribenzylaluminum, tricycloheptylaluminum, trieicosylaluminum, diethylaluminum chloride, ethylaluminum dichloride, ethylmagnesium chloride, phenylaluminum dihydride, n-butylzinc bromide, n-octylzinc hydride, eicosylcadmium iodide, di-n-decylaluminum bromide, cyclohexylcadmium chloride, 3-methylphenylaluminum dichloride, di(4-ethylcyclohexyl) aluminum bromide, tri(3,4-dimethyloctyl) aluminum, di(2-ethylhexyl)zinc and the like.

Organic liquids that can be gelled according to the process of this invention include normally liquid hydrocarbons or mixtures thereof such as naphthas, gasoline, kerosene, light heating oils, gas oils (virgin and cracked such as cyclic oils), benzene, toluene, xylene, ethylbenzene, cyclohexene, cyclopentene, methylcyclohexene, and the like; acyclic ethers such as diethyl ether, methyl n-butyl ether, and diisopropyl ether, cyclic ethers such as oxetane, 1,3-dioxane, and tetrahydrofuran; ketones such as acetone, methyl ethyl ketone and diethyl ketone; and halogenated hydrocarbons such as chloroform and dichloroethane. Mixtures of 2 or more of the above named solvents can also be employed.

In the preparation of the gels, the preferred method is to dissolve the terpolymer in the organic liquid that is to be gelled. After the polymer solution is prepared, the organometallic compound is added. All three compounds can be admixed simultaneously or the organometallic compound can be first added to the organic liquid. The weight ratio of the terpolymer to the liquid to be gelled is in the range of 2 to 50 parts terpolymer, preferably 5 to 25, per 100 parts liquid. The quantity of organometallic compound employed is in the range of 0.2 to 10 millimoles, preferably 1 to 5 millimoles, per 100 milliliters of organic liquid. The liquid material is transformed into a solid gel in a very short time following addition of the organometallic compound. The gel is stable when exposed to the atmosphere but reverts quickly to a liquid of essentially the same consistency as the terpolymer solution upon acidification with a dilute mineral acid such as hydrochloric acid or sulfuric acid, or an organic acid such as acetic acid. Generally, at least 0.1 to 3.0 millimoles of acid are used per millimole of organometallic compound used in gelling the liquid.

The gels produced by the process of this invention can be used for the safe transportation of flammable liquids and for napalm type bombs. They can also be used as a rocket or jet fuel, as a solid fuel for heating, as a fracturing fluid for subterranean formations, and the like. The gelling of volatile compounds considerably lowers their volatility and reduces loss due to evaporation.

The advantages of this invention are further illustrated by the following example. The reactants and the proportions and other specific conditions are presented as being typical and should not be construed to limit the invention unduly.

EXAMPLE

Ten-gram samples of a terpolymer of epichlorohydrin, phthalic anhydride, and tetrahydrofuran were dissolved in 100 milliliters each of toluene, tetrahydrofuran, acetone, and chloroform. Two solutions of each type were prepared. Triisobutylaluminum was added to one solution and diethylzinc to the other, the amount in each case being two millimoles. All solutions gelled very quickly upon addition of the organometallic compound. The gels were stable when exposed to air. Upon addition of 2 milliliters of dilute hydrochloric acid (2.48 molar), the gels were broken and the materials were converted to solutions of essentially the same consistency as they were before treatment with the organometallic compounds.

The terpolymers were prepared from epichlorohydrin, phthalic anhydride and tetrahydrofuran. The polymerization catalyst was triisobutylaluminum. Tetrahydrofuran was used as a polymerization diluent as well as a monomer. The polymerization was conducted in an atmosphere of nitrogen. The order of charge was: phthalic anhydride first, followed by tetrahydrofuran, epichlorohydrin, and triisobutylaluminum. At the conclusion of the polymerization, the reaction was terminated by the addition of isopropyl alcohol. The terpolymer was then separated and dried. The polymer recipes and results are presented in Table I.

TABLE I

| | |
|---|---|
| Epichlorohydrin, g. | 5.5 |
| Phthalic anhydride, g. | 9.0 |
| Tetrahydrofuran, ml. | 100 |
| Triisobutylaluminum, mmoles | 3 |
| Temperature, °F. | 158 |
| Time, hours | 16 |

Although this invention has been described in considerable detail, it must be understood that such detail is for the purposes of illustration only and that many variations and modifications can be made by one skilled in the art without departing from the scope and spirit thereof.

I claim:
1. A method of gelling an organic liquid selected from the group consisting of hydrocarbons, halogen-substituted hydrocarbons, acyclic ethers, cyclic ethers, ketones and mixtures thereof which comprises dissolving in said organic liquid
  (a) a terpolymer prepared by polymerizing the monomers
    (A) an alkene oxide of the formula

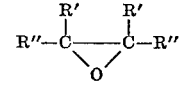

containing up to 20 carbon atoms wherein each R″ and R′ is selected from the group consisting of hydrogen; saturated aliphatic, saturated cycloaliphatic, monoolefinic aliphatic, diolefinic aliphatic, monoolefinic cycloaliphatic, diolefinic cycloaliphatic, aromatic radicals, and combinations thereof; halogen-substituted members thereof; and members thereof containing oxygen in the form of an acyclic ether linkage (—O—), a further oxirane group

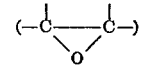

or wherein both R′ substituents taken together form a divalent aliphatic hydrocarbon radical bound to the carbon atoms of the oxirane group to form a cycloaliphatic nucleus containing from 4 to 10 carbon atoms,
    (B) a cyclic acid anhydride containing up to 10 carbon atoms per molecule, and
    (C) a 1,3-epoxide or 1,4-epoxide wherein in said ABC terpolymer the mole ratio of said alkene oxide to said cyclic acid anhydride ranges from 0.6/1 to 1.4/1, and the mole ratio of said 1,3-epoxide or 1,4-epoxide to said cyclic acid anhydride ranges from 0.1/1 to 1/1,
  in the presence of a catalyst of the formula $R'''_nMX_m$ wherein each $R'''$ is a saturated aliphatic, a saturated cycloaliphatic hydrocarbon radical, or a combination thereof containing from 1 to 20 carbon atoms; M is calcium, magnesium, zinc, cadmium, aluminum, gallium, thallium, silicon, or tin; X is hydrogen, fluorine, chlorine, bromine, iodine, or $OR'''$; $n$ is an integer from 1 to 4; $m$ is an integer from 0 to 4 when X is $OR'''$ and from 0 to 3 when X is a hydrogen or a halogen; and $n$ and $m$ equal the valence of the metal M, at a temperature from $-100$ to $300°$ F. for a time from 10 minutes to 50 hours, in a weight ratio of 2 to 50 parts terpolymer per 100 parts of said organic liquid, and
  (b) an organometallic compound wherein said organometallic compound is represented by the formula $R_nMY_m$ wherein each R is an aliphatic, cycloaliphatic, or aromatic hydrocarbon radical containing from 1 to 20 carbon atoms; M is magnesium, cadmium, zinc, or aluminum; Y is hydrogen or a halogen; $n$ is an integer 1, 2 or 3; and $m$ is 0 or an integer 1 or 2, and $n$ plus $m$ equals the valence of the metal M and the amount of said organometallic compound is from 0.2 to 10 millimoles per 100 milliliters of organic liquid.

2. The method of claim 1 wherein each of said monomers in said terpolymer is present in essentially equimolar proportions.

3. The method of claim 1 wherein the weight ratio of said terpolymer to organic liquid to be gelled is in the range of 5 to 25 parts terpolymer per 100 parts organic liquid; and 1 to 5 millimoles of said organometallic compound are used per 100 milliliters of organic liquid to be gelled.

4. The method of claim 1 wherein the monomers in said terpolymer are epichlorohydrin, phthalic anhydride, and tetrahydrofuran.

5. The method of claim 1 wherein said organometallic compound is triisobutylaluminum or diethylzinc.

6. The method of claim 1 wherein said organic liquid is gasoline, kerosene, light heating oil, gas oil (virgin and cracked such as cyclic oil), toluene, tetrahydrofuran, acetone or chloroform.

7. A method of claim 1 wherein the terpolymer is first dissolved in the organic liquid followed by the addition of the organometallic compound.

8. A method of claim 1 wherein the terpolymer, organic liquid and organometallic compound are admixed simultaneously.

9. A method of claim 1 wherein the organometallic compound is added first to the organic liquid followed by the addition of the terpolymer.

10. A gelled composition consisting essentially of
(a) a terpolymer prepared by polymerizing the monomers
(A) an alkene oxide of the formula

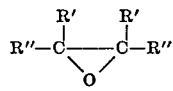

containing up to 20 carbon atoms wherein each R" and R' is selected from the group consisting of hydrogen; saturated aliphatic, saturated cycloaliphatic, monoolefinic aliphatic, diolefinic aliphatic, monoolefinic cycloaliphatic, diolefinic cycloaliphatic, aromatic radicals, and combinations thereof; halogen-substituted members thereof; and members thereof containing oxygen in the form of an acyclic ether linkage (—O—), a further oxirane group

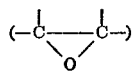

or wherein both R' substituents taken together form a divalent aliphatic hydrocarbon radical bound to the carbon atoms of the oxirane group to form a cycloaliphatic nucleus containing from 4 to 10 carbon atoms,
(B) a cyclic acid anhydride containing up to 10 carbon atoms per molecule, and
(C) a 1,3-epoxide or 1,4-epoxide, wherein in said ABC terpolymer the mole ratio of said alkene oxide to said cyclic acid anhydride ranges from 0.6/1 to 1.4/1, and the mole ratio of said 1,3-epoxide or 1,4-epoxide to said cyclic acid anhydride ranges from 0.1/1 to 1/1 in the presence of a catalyst of the formula $R'''_nMX_m$ wherein each R''' is a saturated aliphatic, a saturated cycloaliphatic hydrocarbon radical, or a combination thereof containing from 1 to 20 carbon atoms; M is calcium, magnesium, zinc, cadmium, aluminum, gallium, thallium, silicon, or tin; X is hydrogen, fluorine, chlorine, bromine, iodine, or $OR''''$; $n$ is an integer from 1 to 4; $m$ is an integer from 0 to 4 when X is $OR''''$ and from 0 to 3 when X is a hydrogen or a halogen; and $n$ and $m$ equal the valence of the metal M, at a temperature from $-100$ to $300°$ F. for a time from 10 minutes to 50 hours.

(b) an organometallic compound represented by the formula $R_nMY_m$ wherein each R is an aliphatic, cycloaliphatic or aromatic hydrocarbon radical containing from 1 to 20 carbon atoms, M is magnesium, cadmium, zinc or aluminum, Y is hydrogen or a halogen, $n$ is an integer 1, 2 or 3, and $m$ is 0 or an integer 1 or 2, and $n$ plus $m$ equals the valence of the metal M; and (c) an organic liquid selected from the group consisting of hydrocarbons, halogen-substituted hydrocarbons, acyclic ethers, cyclic ethers, ketones and mixtures thereof wherein the weight ratio of terpolymer to organic liquid is from 2 to 50 parts terpolymer per 100 parts of organic liquid and the amount of said organometallic compound is from 0.2 to 10 millimoles per 100 milliliters of organic liquid to be gelled.

11. The gelled composition of claim 10 wherein each of said monomers in said terpolymer is present in essentially equimolar proportions.

12. The gelled composition of claim 10 wherein: (a) is the terpolymer of epichlorohydrin, phthalic anhydride and tetrahydrofuran; (b) is triisobutylaluminum or diethylzinc; and (c) is an organic liquid selected from the group consisting of gasoline, kerosene, light heating oil, gas oil (virgin and cracked such as cyclic oil), toluene, tetrahydrofuran, acetone and chloroform.

13. The gelled composition of claim 10 wherein the weight ratio of said terpolymer to said organic liquid is in the range of 5 to 25 parts terpolymer per 100 parts organic liquid; and 1 to 5 millimoles of said organometallic compound are used per 100 millimeters of said organic liquid.

References Cited
UNITED STATES PATENTS

| | | | |
|---|---|---|---|
| 2,620,345 | 12/1952 | Dean | 252—316 X |
| 3,243,270 | 3/1966 | Flanagan | 252—316 X |
| 3,337,511 | 8/1967 | Matsuura et al. | 260—78.4 |
| 3,464,958 | 9/1969 | Matsuura et al. | 60—78.4 |

RICHARD D. LOVERING, Primary Examiner

U.S. Cl. X.R.

44—7 C, 7 D; 149—109; 252—8.55 C, 327; 260—78.4 EP